United States Patent
Daicho

(10) Patent No.: US 11,249,201 B2
(45) Date of Patent: Feb. 15, 2022

(54) SCINTILLATOR MATERIAL AND RADIATION DETECTOR

(71) Applicant: KOITO MANUFACTURING CO., LTD., Tokyo (JP)

(72) Inventor: Hisayoshi Daicho, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 19 days.

(21) Appl. No.: 16/153,101

(22) Filed: Oct. 5, 2018

(65) Prior Publication Data

US 2019/0113635 A1    Apr. 18, 2019

(30) Foreign Application Priority Data

Oct. 13, 2017  (JP) .............................. JP2017-199343

(51) Int. Cl.
*G01T 1/202* (2006.01)
*G01T 1/20* (2006.01)
*G01T 1/16* (2006.01)

(52) U.S. Cl.
CPC .............. *G01T 1/2023* (2013.01); *G01T 1/16* (2013.01); *G01T 1/2002* (2013.01); *G01T 1/202* (2013.01); *G01T 1/2018* (2013.01)

(58) Field of Classification Search
CPC ....... G01T 1/1642; G01T 1/20; G01T 1/2006; G01T 1/2018
See application file for complete search history.

(56) References Cited

U.S. PATENT DOCUMENTS

| | | | |
|---|---|---|---|
| 8,084,742 B1* | 12/2011 | Nagarkar | G01T 1/2008 250/363.03 |
| 2005/0008875 A1 | 1/2005 | Taketomi et al. | |
| 2005/0040366 A1* | 2/2005 | Yagi | C09K 11/7774 252/301.36 |
| 2010/0268074 A1* | 10/2010 | Van Loef | A61B 6/032 600/431 |
| 2011/0114847 A1* | 5/2011 | Fujieda | C08K 3/22 250/370.09 |
| 2012/0205545 A1 | 8/2012 | Kaneko et al. | |
| 2013/0299720 A1 | 11/2013 | Osinski et al. | |
| 2013/0327947 A1 | 12/2013 | Ronda et al. | |

(Continued)

FOREIGN PATENT DOCUMENTS

| CN | 105330163 A | 2/2016 |
|---|---|---|
| CN | 109071324 A | 12/2018 |

(Continued)

OTHER PUBLICATIONS

Rowe "High-Performance Doped Strontium Iodide Crystal Using a Modified Bridgman Method", Virginia Commonwealth University, Mar. 2014, p. 1-118 (Year: 2014).*

(Continued)

*Primary Examiner* — David P Porta
*Assistant Examiner* — Mamadou Faye
(74) *Attorney, Agent, or Firm* — Sughrue Mion, PLLC

(57) ABSTRACT

A scintillator material includes a matrix phase and scintillator parts dispersed in the matrix phase. The scintillator parts contain fine particles of single crystal. According to the above aspect, since the scintillator parts containing the fine particles of single crystal are dispersed in the matrix phase, it is possible to reduce an influence from an environment.

5 Claims, 5 Drawing Sheets

(56) References Cited

U.S. PATENT DOCUMENTS

| | | | |
|---|---|---|---|
| 2014/0166889 A1* | 6/2014 | Kang | C03C 4/12 250/366 |
| 2016/0068748 A1 | 3/2016 | Sakuragi | |
| 2017/0236609 A1 | 8/2017 | Tanino et al. | |
| 2019/0047903 A1 | 2/2019 | Iwasaki et al. | |

FOREIGN PATENT DOCUMENTS

| | | |
|---|---|---|
| JP | 2003-502647 A | 1/2003 |
| JP | 2012-168059 A | 9/2012 |
| JP | 2014-510902 A | 5/2014 |
| JP | 2016-56030 A | 4/2016 |
| JP | 2017-78636 A | 4/2017 |
| WO | 00/77545 A1 | 12/2000 |
| WO | 2016/021540 A1 | 2/2016 |

OTHER PUBLICATIONS

Communication dated Nov. 23, 2020 issued by the French Intellectual Property Office in counterpart French Application No. FR1859429.

Office Action dated May 27, 2021, issued by the State Intellectual Property Office of P.R. China in counterpart Chinese Patent Application No. 201811188044.6.

Hong et al., "Rare Earth Luminescent Materials," pp. 226-227, 2016 (total 4 pages).

Lehmann, "Heterogeneous Halide-Silica Phosphors," Journal of The Electrochemical Society, vol. 122, No. 6, pp. 748-752, Jun. 1975 (total 6 pages).

Communication dated Aug. 31, 2021 issued by the Japanese Intellectual Property Office in counterpart Japanese Application No. 2017-199343.

* cited by examiner

100

SCINTILLATOR MATERIAL AND RADIATION DETECTOR

CROSS-REFERENCE TO RELATED APPLICATION

This application claims priority from Japanese Patent Application No. 2017-199343 filed on Oct. 13, 2017, the entire contents of which are incorporated herein by reference.

FIELD

The present disclosure relates to a scintillator material.

In the related art, a scintillator has been known as a material that is excited by radiation and emits fluorescence or phosphorescence. For example, as a high-sensitive and high-resolution material of the scintillator, Eu-doped $SrI_2$ single crystal has been known (refer to Patent Document 1).

Patent Document 1: JP-A-2016-56030

However, as the material of the scintillator including $SrI_2$, there is a material having high deliquescence, so that it is necessary to conceive a manufacturing method thereof and there is a further room for improvement on humidity resistance for long-term usage.

The present disclosure has been made in view of the above situations, and an object thereof is to provide a new scintillator material having excellent humidity resistance.

SUMMARY

In order to achieve the above object, a scintillator material in accordance with one aspect of the present disclosure includes a matrix phase, and scintillator parts dispersed in the matrix phase. The scintillator parts contain fine particles of single crystal.

According to the above aspect, since the scintillator parts containing the fine particles of single crystal are dispersed in the matrix phase, it is possible to reduce an influence from an environment.

The scintillator parts may be eccentrically distributed in a crystal region in which a part of the matrix phase is crystalized. Thereby, it is possible to form the scintillator parts in the matrix phase relatively conveniently.

The matrix phase may be silica, and the crystal region may have a cristobalite structure in which a part of the silica is crystalized. Thereby, it is possible to use the relatively stable silica, as a raw material.

The fine particle of single crystal may be a deliquescent compound. In the related art, the fine particle of single crystal formed of a deliquescent compound has an extremely short lifetime for which it functions as the scintillator. However, according to the above aspect, it is possible to use a variety of compounds having low humidity resistance, which could not be used in the related art, inasmuch as it is possible to satisfy the initial performance as the scintillator.

The compound may be a luminescent material expressed by $SrI_2$:Eu.

The compound may be a luminescent material expressed by CsI:Tl.

Another aspect of the present disclosure is a radiation detector. The radiation detector includes a substrate, the scintillator material provided at one side of the substrate and a photoelectric conversion element provided at the other side of the substrate. In the substrate, a transmissivity of light having a peak wavelength of light emitted from the scintillator material is 50% or greater. Thereby, it is possible to implement the radiation detector having excellent humidity resistance.

In the meantime, any combination of the above-described constitutional elements and a method, a device, a system and the like to be expressed by the present disclosure are also effective as aspects of the present disclosure.

According to the present disclosure, it is possible to provide the radiation detector having excellent humidity resistance.

DETAILED DESCRIPTION

Figure 1A:
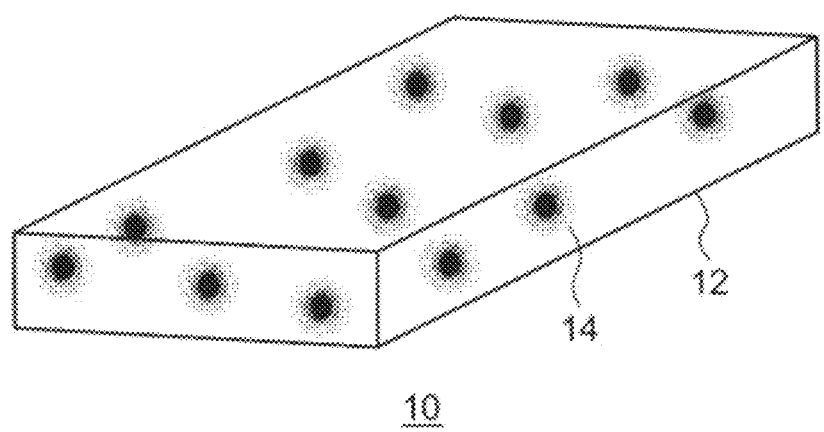
FIG. 1A is a pictorial view of a plate-shaped scintillator.

Hereinafter, an embodiment for implementing the present disclosure will be described in detail with reference to the drawings. In the description of the drawings, the same elements are denoted with the same reference numerals, and the duplicated descriptions thereof are appropriately omitted.

(Scintillator)

Figure 1B:
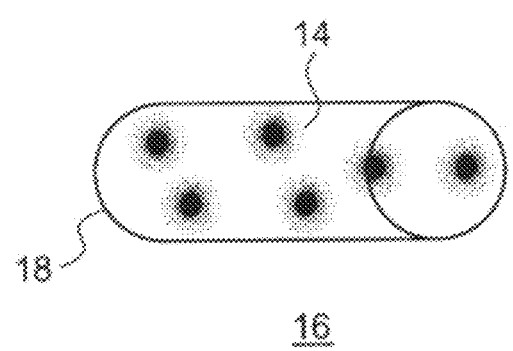
FIG. 1B is a pictorial view of a fiber-shaped scintillator.
Figure 1C:
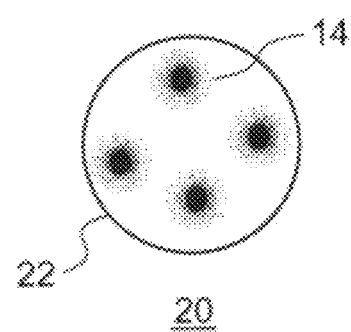
FIG. 1C is a pictorial view of a particle-shaped scintillator.

First, a schematic configuration of a nano-composite type luminescent material in accordance with an embodiment is described. FIG. 1A is a pictorial view of a plate-shaped scintillator, FIG. 1B is a pictorial view of a fiber-shaped scintillator, and FIG. 1C is a pictorial view of a particle-shaped scintillator.

The scintillator is a luminescent material that absorbs radiation (X-ray, γ-ray, neutron ray) to emit ultraviolet light or visible light. As the scintillator, a material having high resistivity and resolution is preferable. That is, the scintillator is required to effectively convert the radiation into light and to have a short light emission lifetime. There is $SrI_2$:$Eu^{2+}$ as one of the materials actually realizing the characteristics. However, since $SrI_2$:$Eu^{2+}$ exhibits severe deliquescence, it is very difficult to manufacture and handle the same. Therefore, the inventors conceived a configuration of suppressing the deliquescence by dispersing scintillator parts in a matrix phase.

A scintillator material 10 shown in FIG. 1A includes a plate-shaped matrix phase 12, and scintillator parts 14 dispersed in the matrix phase 12. The scintillator part 14 contains a luminescent material formed of fine particles of single crystal. A scintillator material 16 shown in FIG. 1B includes a fiber-shaped matrix phase 18, and the scintillator parts 14 dispersed in the matrix phase 18. A scintillator material 20 shown in FIG. 1C includes a particle-shaped matrix phase 22, and the scintillator parts 14 dispersed in the matrix phase 22.

In each scintillator material, the scintillator parts 14 containing the fine particles of single crystal are dispersed in the matrix phase. For this reason, as compared to a configuration where the scintillator part 14 is singularly exposed, an influence from an environment is reduced, so that the humidity resistance is improved.

Subsequently, a process of forming the nano-composite type scintillator material containing the fine particles of single crystal is described in detail. In the below, a configuration where the matrix phase is silica is described. FIGS. 2A to 2D are pictorial views a mechanism by which a nano-composite type scintillator material is formed.

Figure 2B:
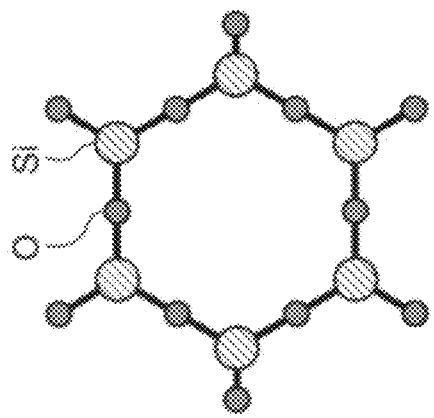
FIGS. 2A to 2D are pictorial views a mechanism by which a nano-composite type scintillator material is formed.

Silica has an amorphous structure having a basic skeleton in which a $SiO_4$ tetrahedron is coupled by Si—O—Si bond. A bond angle of Si—O—Si is 145°±10° (FIG. 2A). When silica is heated, a thermal expansion rate is small about 1000° C. but gently increases from a temperature exceeding 1000° C. The reason is that active hydrogens are generated from OH-groups on a silica surface and breakage and rearrangement of the Si—O—Si bonds occur. At this time, the bond angle of Si—O—Si becomes 180° and large voids are formed in the $SiO_4$ interlink net (FIG. 2B). The void becomes a pocket for a cation 24 of metal such as $Sr^{2+}$, $Cs^+$, $Ca^{2+}$, $Eu^{2+}$, $Tl^+$ and the like and an anion 26 such as halogen, so that the corresponding ions are introduced into the $SiO_4$ interlink net (FIG. 2C).

Figure 2D:
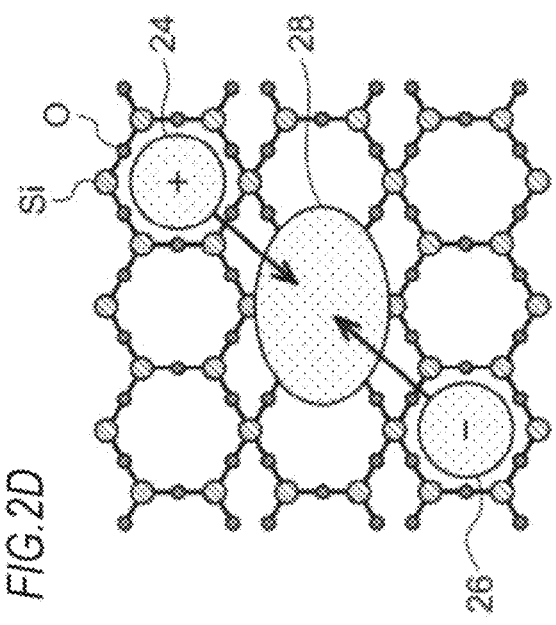
Figure 2A:
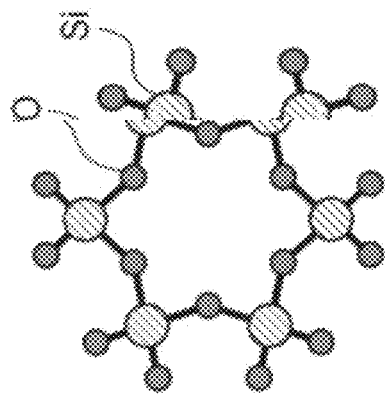
Figure 2C:
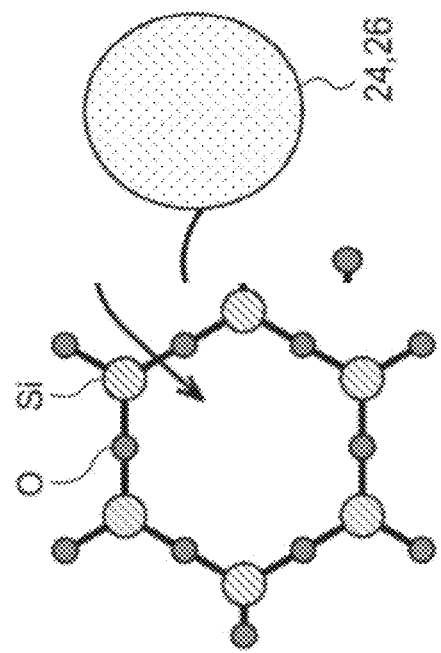

The introduced cation 24 and anion 26 are bonded by thermal diffusion, so that an ionic crystal nucleus 28 is generated (FIG. 2D). As the ionic crystal nuclei 28 are generated, silica of the matrix phase is also crystallized, so that cristobalite is generated. It is guessed that the nano-composite type scintillator material is generated in this way. In the meantime, the matrix phase may be formed of tridymite, quartz or the like, instead of cristobalite, and the scintillator parts may be provided therein.

Like this, a part of silica, which is the matrix phase, is crystallized at least at an interface between the scintillator part of the embodiment and the matrix phase, so that a cristobalite structure is formed. Thereby, since it is possible to eccentrically distribute the scintillator parts in the matrix phase relatively conveniently, it is possible to further stabilize the scintillator parts contained in the scintillator material. Also, it is possible to use the relatively stabilized silica, as a raw material of the matrix phase.

Subsequently, the present disclosure is described in more detail with reference to each example.

Example 1

A nano-composite of Example 1 contains $SrI_2$:$Eu^{2+}$, as a luminescent component, in the crystalline silica matrix. In a manufacturing method thereof, amorphous silica (an average particle size: 10 μm) having a crystallization temperature of 1350° C., $SrI_2$ (a melting point: 402° C.) and $EuI_3$ were precisely weighted so that a mole ratio was to be 6/0.75/0.05, were put in a quartz mortar under Ar gas atmosphere and were pulverized and mixed. Then, the mixed powders were put in an alumina crucible and fired at 1000° C. for 10 hours under hydrogen-containing nitrogen atmosphere (a volume ratio $N_2/H_2$=95/5). After the firing, the powders were cleaned by warm pure water to remove excessive iodide, so that a sample of the nano-composite of Example 1 was obtained.

Figure 3:
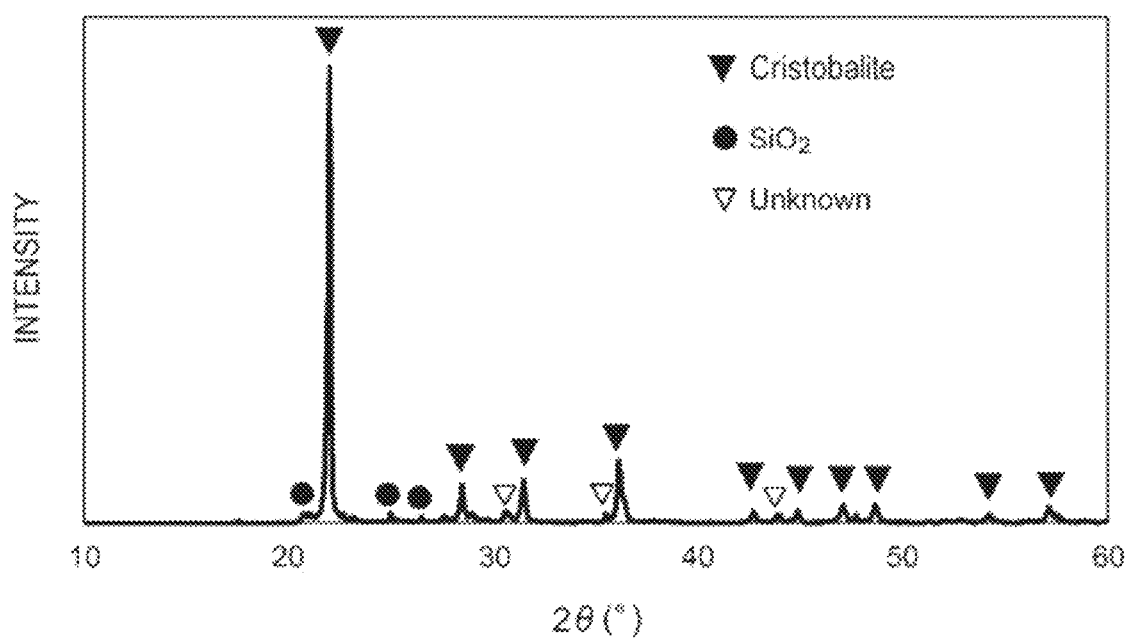
FIG. 3 depicts an X-ray diffraction pattern of a nano-composite in accordance with Example 1.
Figure 4:
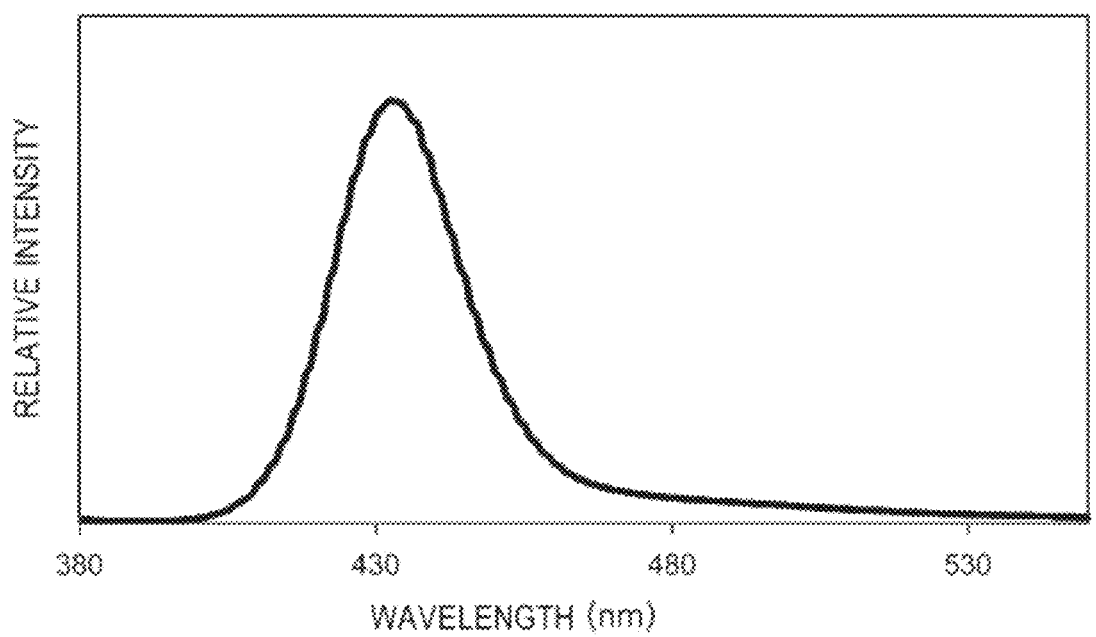
FIG. 4 depicts a luminescence spectrum of the nano-composite in accordance with Example 1.

Then, the obtained sample was subjected to powder X-ray diffraction measurement. FIG. 3 depicts an X-ray diffraction pattern of the nano-composite in accordance with Example 1. Analyzing the peaks shown in FIG. 3, the nano-composite of Example 1 was powders in which α-cristobalite, which is a high-temperature crystal layer of silica, is a main phase. As a result of irradiation of ArF excimer laser having a peak wavelength of 193 nm to the nano-composite, it was possible to observe blue luminescence having a peak wavelength of 432 nm originating from $Eu^{2+}$ doped in $SrI_2$. FIG. 4 depicts a luminescence spectrum of the nano-composite in accordance with Example 1.

Figure 5:
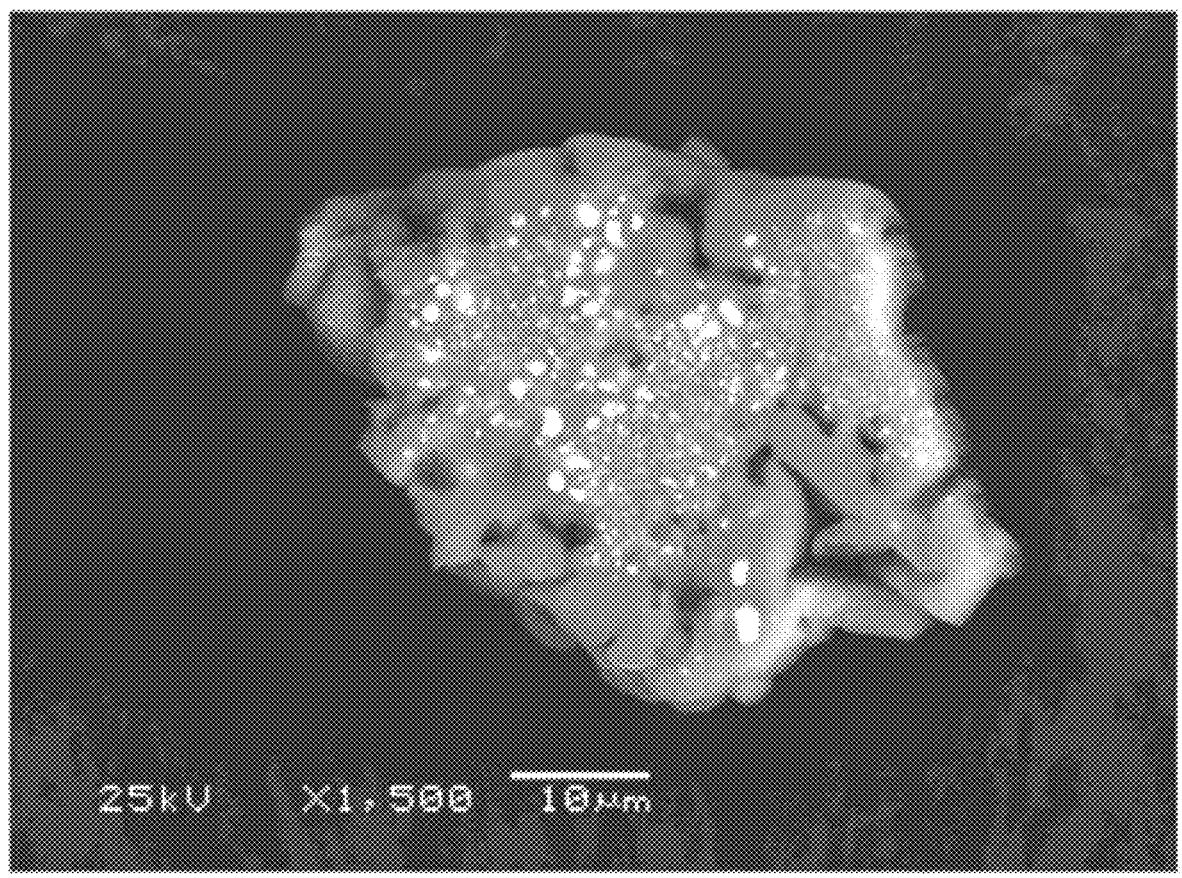
FIG. 5 depicts a SEM image of the nano-composite in accordance with Example 1.

Then, the nano-composite of Example 1 was cut using a focused ion beam (FIB) device and a section thereof was observed with a scanning electron microscope (SEM). FIG. 5 depicts a SEM image of the nano-composite in accordance with Example 1.

The nano-composite shown in FIG. 5 has two phases of a gray matrix part and white point parts dispersed in a center of the matrix part. The respective parts were subjected to composition analysis by using an energy dispersive X-ray spectroscopic device (EDX) annexed to the SEM. As a result, the matrix part was $SiO_2$, and the white point part had Sr, I and Eu of which content percentages were increased, as compared to the surrounding. That is, the sample of Example 1 was a nano-composite material in which nano-order $SrI_2$:$Eu^{2+}$ was eccentrically distributed.

Figure 6:
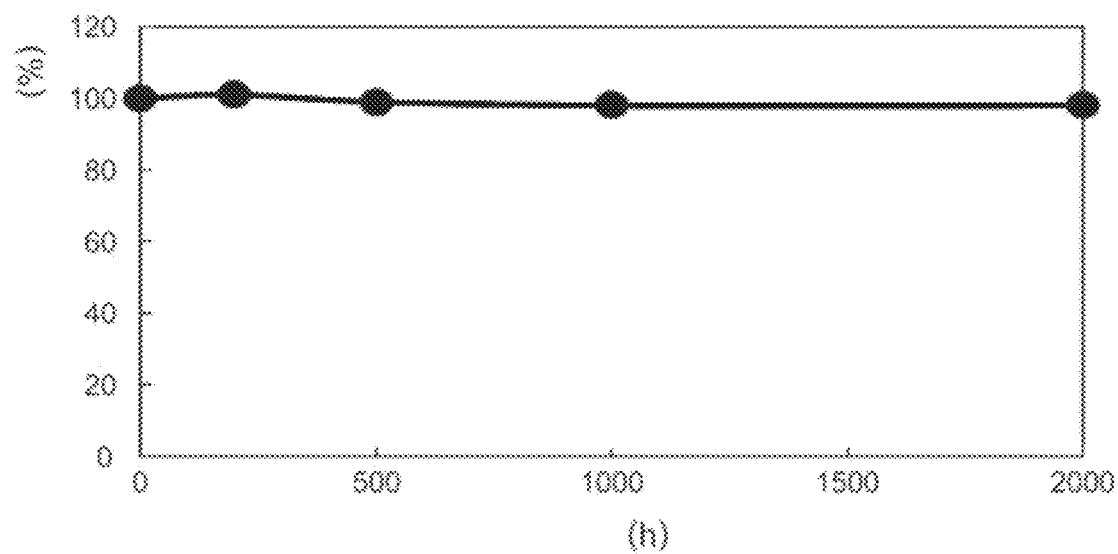
FIG. 6 depicts a result of a lifetime test of the nano-composite type scintillator material.

Also, the scintillator parts are eccentrically distributed in a crystal region in which a part of the matrix phase is crystalized. For this reason, $SrI_2$:$Eu^{2+}$, which is a luminescent part (the scintillator part), is protected by the crystalline $SiO_2$ cristobalite and thus has the sufficient humidity resistance. FIG. 6 depicts a result of a lifetime test of the nano-composite scintillator material. The lifetime test was performed under environments of temperature of 85° C. and humidity of 85%, and the luminescence intensity was measured at each time when the luminescence was continuously made up to 2000 h. As a result, the nano-composite scintillator material of Example 1 keeps 98% intensity of the initial intensity after 2000 h, and has the remarkably improved humidity resistance.

Like this, the fine particle of single crystal of $SrI_2$:$Eu^{2+}$ was a deliquescent compound and has the extremely short lifetime for which it functions as the scintillator. However, the scintillator material of Example 1 can use a variety of compounds having low humidity resistance, which could not be used in the related art, inasmuch as it is possible to satisfy the initial performance as the scintillator.

Figure 7:
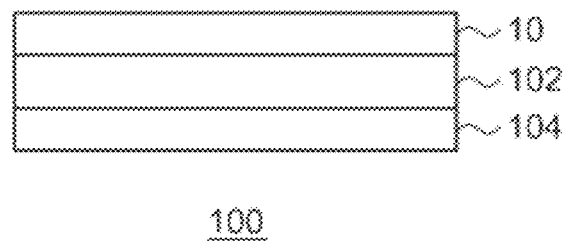
FIG. 7 depicts a schematic configuration of a radiation detector in accordance with the embodiment.

FIG. 7 depicts a schematic configuration of a radiation detector in accordance with the embodiment. A radiation detector 100 shown in FIG. 7 includes a transparent substrate 102 having high transmissivity of light around a wavelength 430 nm, the scintillator material 10 provided at one side of the transparent substrate 102, and a photoelectric conversion element 104 provided at the other side of the transparent substrate 102. The transparent substrate 102 may be any substrate of which transmissivity of light, which has a peak wavelength (for example, 430 nm), of light emitted from the scintillator material 10 is 50% or greater. The transparent substrate 102 has preferably transmissivity of light of 70% or greater, and more preferably 85% or greater. Thereby, it is possible to implement the radiation detector having excellent humidity resistance and high sensitivity.

Example 2

A nano-composite of Example 2 contains CsI:$Tl^+$, as a luminescent component, in the crystalline silica matrix. In a manufacturing method thereof, amorphous silica (an average particle size: 10 μm) having a crystallization temperature of 1350° C., CsI (a melting point: 621° C.) and TlI were precisely weighted so that a mole ratio was to be 6/0.45/0.05, were put in the quartz mortar under Ar gas atmosphere and were pulverized and mixed. Then, the mixed powders were put in the alumina crucible and fired at 1000° C. for 10 hours under hydrogen-containing nitrogen atmosphere (a volume ratio $N_2/H_2=95/5$). After the firing, the powders were cleaned by warm pure water to remove excessive iodide, so that a sample of the nano-composite of Example 2 was obtained.

Then, the obtained sample was subjected to the powder X-ray diffraction measurement. The nano-composite of Example 2 was powders in which α-cristobalite, which is a high-temperature crystal layer of silica, is a main phase. As a result of irradiation of ArF excimer laser having a peak wavelength of 193 nm to the nano-composite, it was possible to observe green luminescence having a peak wavelength of 550 nm originating from Tl doped in CsI.

Then, the nano-composite of Example 2 was cut using the focused ion beam (FIB) device and a section thereof was observed with the scanning electron microscope (SEM).

The nano-composite of Example 2 has two phases of a gray matrix part and white point parts dispersed in a center of the matrix part, like Example 1. The respective parts were subjected to composition analysis by using the energy dispersive X-ray spectroscopic device (EDX) annexed to the SEM. As a result, the matrix part was $SiO_2$, and the white point part had Cs, I and Tl of which content percentages were increased, as compared to the surrounding. That is, the sample of Example 2 was a nano-composite material in which nano-order $CsI:Tl^+$ was eccentrically distributed.

Also, a radiation detector of Example 2 includes a transparent substrate 102 having high transmissivity of light around a wavelength 550 nm, the scintillator material 10 provided at one side of the transparent substrate 102, and a photoelectric conversion element 104 provided at the other side of the transparent substrate 102, like the radiation detector 100 described in Example 1. The transparent substrate 102 may be any substrate of which transmissivity of light, which has a peak wavelength (for example, 550 nm), of light emitted from the scintillator material 10 is 50% or greater. The transparent substrate 102 has preferably transmissivity of light of 70% or greater, and more preferably 85% or greater. Thereby, it is possible to implement the radiation detector having excellent humidity resistance and high sensitivity.

Example 3

A nano-composite of Example 3 contains $SrI_2:Eu^{2+}$, as a luminescent component, in the crystalline silica matrix. A manufacturing method thereof is different from Example 1.

In the manufacturing method of the nano-composite of Example 3, a quartz glass having a size 30 mm×30 mm and a thickness 3 mm is prepared as the matrix phase, and a surface thereof is roughened (an arithmetic average roughness Ra=10 μm) by sand blasting. In the meantime, the roughness may be appropriately selected within a range of 5 to 20 μm. Also, the glass surface is preferably cleaned with pure water. Then, a mixed raw material 1g is placed in a uniform thickness on the glass.

Then, the glass was moved into a firing furnace and was fired at 1000° C. for 10 hours under hydrogen-containing nitrogen atmosphere (volume ratio $N_2/H_2=95/5$). After the firing, the glass was cleaned with warm pure water to remove excessive iodide. As a result, about 1.5 mm of the quartz glass from the roughened surface was cristobalitized and became cloudy. As a result of irradiation of ArF excimer laser having a peak wavelength of 193 nm to the nano-composite, it was possible to observe blue luminescence having a peak wavelength of 432 nm originating from $Eu^{2+}$ doped in $SrI_2$.

In the meantime, a compound capable of exhibiting a function thereof may be dispersed as nano-polycrystals in the matrix phase, instead of single nano-crystals.

The present disclosure has been described with reference to the embodiment and the respective examples. The embodiment and the respective examples are just exemplary, and one skilled in the art can understand that combinations of the respective constitutional elements and the respective processing can be diversely modified and the modifications are also included within the scope of the present disclosure.

The invention claimed is:

1. A scintillator material comprising:
   a matrix phase; and
   scintillator parts dispersed in the matrix phase,
   wherein the scintillator parts consist of fine particles of a halogenide which is a single crystal or a polycrystal,
   wherein the matrix phase is silica,
   wherein the scintillator parts are eccentrically distributed in a center of a crystal region in which a part of the silica is crystalized, and
   wherein the fine particle is a deliquescent compound.

2. The scintillator material according to claim 1,
   wherein the crystal region includes a cristobalite structure in which a part of the silica is crystalized.

3. The scintillator material according to claim 1,
   wherein the compound is a luminescent material expressed by $SrI_2:Eu$.

4. The scintillator material according to claim 1,
   wherein the compound is a luminescent material expressed by CsI:Tl.

5. A radiation detector comprising:
   a substrate;
   the scintillator material according to claim 1 provided at one side of the substrate; and
   a photoelectric conversion element provided at the other side of the substrate,
   wherein the substrate is configured such that a transmissivity of light having a peak wavelength of light emitted from the scintillator material is 50% or greater.

* * * * *